Patented Nov. 2, 1926.

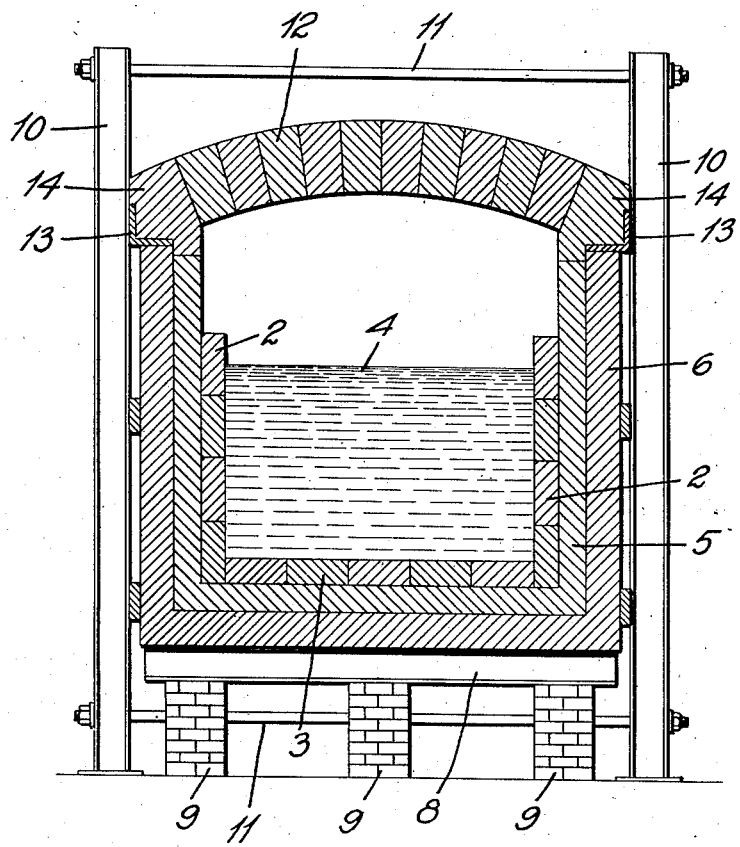

1,605,885

UNITED STATES PATENT OFFICE.

PAUL G. WILLETTS, OF BERLIN, CONNECTICUT, ASSIGNOR TO HARTFORD-EMPIRE COMPANY, OF HARTFORD, CONNECTICUT, A CORPORATION OF DELAWARE.

GLASS FURNACE.

Application filed June 24, 1926. Serial No. 118,235.

My invention relates to glass melting furnaces, and its object is to provide such a furnace having its bottom and its melting end lined with a high-grade refractory material which will not float in the molten glass and which, therefore, may be safely backed by other material for insulating or reinforcing purposes.

The single figure of the accompanying drawing is a transverse vertical sectional view through a portion of a glass furnace constructed in accordance with my invention, the heating arrangements and some details of construction being omitted.

It has been recognized that it would be desirable to line glass melting furnaces with blocks of high-grade refractory material and to surround the side walls and bottom with insulating layers or with layers of ordinary refractory material to add to the strength of the walls and to reduce the dissipation of heat through them. It has not been possible to do this with safety, however, because the refractories that have been at all suitable for contact with the glass have been lighter than the molten glass and, therefore, able to float in the glass. In such cases, molten glass penetrating between and beneath the blocks composing the furnace lining would cause the blocks to float out of place. The bottom blocks and the top courses of the side walls are particularly likely to be dislodged in this way, especially at the melting end of the furnace where the glass temperature is highest. The side-wall blocks can be kept in place by loading them with additional weight, as by supporting the crown and the bridge wall upon the glass-engaging side walls, but the bottom blocks may still float out of place, even if the side walls are loaded. Therefore, it has been the customary practice to build the bottoms of glass furnaces, and the side walls at the melting ends of the furnaces, of single layers of blocks, so that the glass entering between the blocks will freeze before the glass can penetrate behind the blocks and float them out of place. This is one of the reasons why the dissipation of heat from glass furnaces has been so high, and although it has long been recognized that a large part of the heat introduced into glass furnaces is dissipated uselessly through the furnace walls, it has not been possible safely to insulate the furnace walls, except the side walls at the working end of the furnace where the glass is coldest.

According to my present invention, I provide the bottom and side walls of a glass melting furnace with glass-engaging surfaces composed of refractory blocks of high grade and of such specific gravity that they are heavier than the molten glass which is to come into contact with the blocks. If the glass should penetrate between and behind such blocks, this does no harm, because the glass will not be able to dislodge the blocks by causing them to float. I also prefer to improve further the construction of the furnace by surrounding the side walls and bottom with cheaper refractory blocks, intended to increase the strength of the furnace, and I may also safely surround the side walls and bottom of the furnace with insulating material. As pointed out above, the use of such insulating material does not enable the molten glass to float the lining blocks out of place, because such blocks are heavier than the molten glass.

The accompanying drawing is a somewhat diagrammatic illustration of the manner in which my invention is employed. In the drawing, the numerals 2 indicate the side wall lining of the furnace and the numeral 3 the bottom wall lining, these linings being composed of refractory blocks of high grade, that are heavier than the molten glass 4 and are capable of great resistance to the corrosive and erosive action of molten glass. The refractory linings 2 and 3 are surrounded by a backing layer 5 which may be composed of ordinary refractory material, such as the flux blocks heretofore used in building glass tanks, this backing layer serving to strengthen the tank walls and to distribute the stresses therein, particularly to support the weight of the furnace from beneath and to resist outward stresses in the upper portions of the furnace. Outside of the backing layer 5 is an outer layer 6 of fire brick or insulation. The sides and bottom of the furnace rest upon cross-beams 8 that are supported upon piers 9. The usual buck-stays 10, connected by tie rods 11, support the furnace crown 12 independently of the side walls. For this purpose angle beams 13 are secured to the buck-stays 10 and carry skew-blocks 14 which support the arched crown 12.

The blocks composing the side and bottom linings 2 and 3 may be provided with interlocking corrugations to reduce the penetration of molten glass between the blocks, as shown in my copending application for Letters Patent filed April 6, 1926, Serial No. 100,121.

My present invention is not limited to the use of any particular material as the lining of the furnace, but I may suitably employ for this purpose the refractory tank blocks described and claimed in my copending application for Letters Patent filed March 1, 1926, Serial No. 91,361, wherein I describe high grade refractories composed mainly of combined silica and alumina and made by a process including the grinding of selected silicious and aluminous ingredients to such fineness as to enable the ingredients to combine with substantial homogeneity, intimately mixing the ingredients in selected proportions, forming the mixed materials into preliminary bodies suitable for handling, firing the preliminary bodies, grinding the fired material to such fineness to form a grog or skeleton for a subsequent final assembly, then making such final assembly by mixing the ground material in selected proportions with other unfired material of the same composition and ground to materially greater fineness, pressing the finally assembled material to form blocks of the desired size and shape, and firing the pressed blocks to a temperature sufficient to cause the silicious and aluminous material to combine, but without sufficient fusion to materially change the shape of the blocks. For further details as to the preparation of such blocks, reference may be had to my copending application identified above.

The invention described above accomplishes a new and valuable result, in that it gives the glass art the ability to safely insulate the bottom of a melting furnace, and the ability to safely insulate all parts of the side walls of the furnace without loading the side walls with extra weight.

It will be understood that my invention is not limited to the details of construction which are shown herein for illustrative purposes only, and that my invention includes all such structures as fall within the scope of the appended claims.

I claim as my invention:

1. A glass furnace having at least a part of the glass-engaging portion of its bottom composed of refractory blocks which are of greater specific gravity than the molten glass to be contained in said furnace, and which therefore cannot be dislodged by floating in said glass.

2. A glass furnace having at least a portion of its glass-engaging side walls composed of refractory blocks which are of greater specific gravity than the glass that is to be contained in said furnace and which therefore cannot be dislodged by floating in said glass.

3. A glass furnace having its glass-contacting sides and bottom lined, at least in part with refractory blocks which are of greater specific gravity than the molten glass to be contained in said furnace and which therefore cannot be dislodged by floating in said glass.

4. A glass furnace having its glass-contacting sides and bottom lined, at least in part with refractory blocks that are of greater specific gravity than the molten glass to be contained in said furnace, the said lining being surrounded by a backing of other refractory material.

5. A glass furnace having its glass-contacting sides and bottom lined, at least in part with refractory blocks that are of greater specific gravity than the molten glass to be contained in said furnace, the said lining being surrounded by a backing of insulating material.

6. A glass furnace having its glass-contacting sides and bottom lined, at least in part with refractory blocks that are of greater specific gravity than the molten glass to be contained in said furnace, the said lining being surrounded by a backing of other refractory material and with a layer of insulating material.

7. A glass furnace having its glass-contacting sides lined with refractory blocks that are of greater specific gravity than the molten glass to be contained in said furnace, a backing of other material surrounding said lining, a crown spanning said side walls, and means for supporting the weight of said crown independently of said side walls.

8. A glass furnace having its melting end lined with refractory blocks which are of greater specific gravity than the molten glass to be contained in said furnace, and which therefore cannot be dislodged by floating in said glass, the region of the furnace that is so lined being backed by other refractory material.

9. A glass furnace having its melting end lined with refractory blocks which are of greater specific gravity than the molten glass to be contained in said furnace, and which therefore cannot be dislodged by floating in said glass, the region of the furnace that is so lined being backed by a layer of insulating material.

10. A glass furnace having its melting end lined with refractory blocks which are of greater specific gravity than the molten glass to be contained in said furnace, and which therefore cannot be dislodged by floating in said glass, the region of the furnace that is so lined being backed by a layer of other refractory material and by a layer of insulating material.

11. A glass furnace having at least a part of the glass-engaging portion of its bottom composed of refractory blocks which are of greater specific gravity than the molten glass to be contained in said furnace, and which therefore cannot be dislodged by floating in said glass, the said blocks being backed by other refractory material.

12. A glass furnace having at least a part of its glass engaging surface composed of refractory blocks which are of greater specific gravity than the molten glass to be contained in said furnace, and which therefore cannot be dislodged by floating in said glass.

13. A glass furnace having at least a part of its glass-engaging surface composed of refractory blocks which are of greater specific gravity than the molten glass to be contained in said furnace, and which therefore cannot be dislodged by floating in said glass, the said blocks being backed by other refractory material.

Signed at Hartford, Conn., this 18th day of June, 1926.

PAUL G. WILLETTS.